US011927053B2

(12) United States Patent
Broad et al.

(10) Patent No.: US 11,927,053 B2
(45) Date of Patent: *Mar. 12, 2024

(54) WINDOW SILL FLASHING

(71) Applicant: PN II, Inc., Atlanta, GA (US)

(72) Inventors: Robert Patrick Broad, Ypsilanti, MI (US); Jay K. McDonald, White Lake, MI (US)

(73) Assignee: PN II, INC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/953,698

(22) Filed: Sep. 27, 2022

(65) Prior Publication Data

US 2023/0025044 A1 Jan. 26, 2023

Related U.S. Application Data

(63) Continuation of application No. 15/884,690, filed on Jan. 31, 2018, now Pat. No. 11,486,192, which is a continuation of application No. 14/079,099, filed on Nov. 13, 2013, now Pat. No. 9,920,570, which is a continuation of application No. 10/871,401, filed on Jun. 18, 2004, now abandoned.

(60) Provisional application No. 60/487,343, filed on Jul. 15, 2003.

(51) Int. Cl.
*E06B 7/26* (2006.01)
*B29C 67/00* (2017.01)
*E04B 1/66* (2006.01)
*E06B 1/62* (2006.01)
*E06B 1/70* (2006.01)

(52) U.S. Cl.
CPC ............ *E06B 7/26* (2013.01); *B29C 67/0011* (2013.01); *E04B 1/665* (2013.01); *E06B 1/62* (2013.01); *E06B 1/70* (2013.01)

(58) Field of Classification Search
CPC ..... E06B 7/26; E06B 1/62; E06B 1/70; B29C 67/0011; E04B 1/665
See application file for complete search history.

(56) References Cited

U.S. PATENT DOCUMENTS

| | | |
|---|---|---|
| 385,065 A | 6/1888 | Milroy |
| 448,501 A | 3/1891 | Bussert |
| 665,958 A | 1/1901 | Dugan |
| 1,677,130 A | 7/1928 | Cherry |
| 1,875,495 A | 9/1932 | Reese |
| 2,095,072 A | 10/1937 | Ludden |
| 2,129,381 A | 9/1938 | Oftedal et al. |

(Continued)

FOREIGN PATENT DOCUMENTS

CH 481303 11/1969

OTHER PUBLICATIONS

Window Installation—An Evolving Challenge, Butt, T. K., FAIA, Nov. 8, 2004, pp. 1-13.

(Continued)

*Primary Examiner* — Adriana Figueroa
(74) *Attorney, Agent, or Firm* — The Dobrusin Law Firm, P.C.; Daniela M. Thompson-Walters

(57) ABSTRACT

The present invention is directed towards a window sill flashing comprising a base having a substantially rectangular shape. A front flange projects perpendicularly downward from a front edge of the base and at least one side flange extends vertically from a side edge of the base. The side flange includes a front surface. The window sill flashing is made from a rigid homopolymer vinyl film.

17 Claims, 10 Drawing Sheets

(56) References Cited

U.S. PATENT DOCUMENTS

| | | |
|---|---|---|
| 2,482,170 A | 9/1949 | Gunnison |
| 2,648,107 A | 8/1953 | Bates |
| 2,697,932 A | 12/1954 | Goodwin |
| RE25,590 E | 6/1964 | Miller |
| 3,527,012 A | 9/1970 | Hemminger |
| 3,851,420 A | 12/1974 | Tibbetts |
| 3,854,246 A | 12/1974 | McAllister |
| 4,055,917 A | 11/1977 | Coller |
| 4,081,941 A | 4/1978 | Van Ausdall |
| 4,098,027 A | 7/1978 | Crance |
| 4,102,090 A | 7/1978 | Anguish |
| 4,411,104 A | 10/1983 | St. Aubin |
| 4,549,379 A | 10/1985 | Hoy |
| 4,555,882 A | 12/1985 | Moffitt et al. |
| 4,663,905 A | 5/1987 | Schulz |
| 4,700,512 A | 10/1987 | Laska |
| 4,972,638 A | 11/1990 | Minter |
| 5,115,605 A | 5/1992 | Butler |
| 5,377,464 A | 1/1995 | Mott et al. |
| 5,542,217 A | 8/1996 | Larivee, Jr. |
| 5,653,072 A | 8/1997 | Seelandt et al. |
| 5,899,026 A | 5/1999 | Williams et al. |
| 5,924,259 A | 7/1999 | Marousek |
| 6,038,821 A | 3/2000 | Larson et al. |
| 6,041,560 A | 3/2000 | Larson et al. |
| 6,045,921 A | 4/2000 | Restaino et al. |
| 6,098,343 A | 8/2000 | Brown et al. |
| 6,212,834 B1 | 4/2001 | Lindgren |
| 6,219,979 B1 | 4/2001 | Lohr |
| 6,244,001 B1 | 6/2001 | Anastasi |
| 6,269,591 B1 | 8/2001 | Kelly |
| 6,305,132 B1 | 10/2001 | Smith |
| 6,371,188 B1 | 4/2002 | Baczuk et al. |
| 6,385,925 B1 | 5/2002 | Wark |
| 6,401,401 B1 | 6/2002 | Williams |
| 6,401,402 B1 | 6/2002 | Williams |
| 6,484,446 B2 | 11/2002 | Young |
| 6,681,530 B1 | 1/2004 | Givens |
| 6,725,610 B2 | 4/2004 | Murphy et al. |
| 6,868,643 B1 | 3/2005 | Williams et al. |
| 6,941,713 B2 | 9/2005 | Williams et al. |
| 7,222,462 B2 | 5/2007 | Ellingson |
| 7,673,426 B2 | 3/2010 | Broad et al. |
| 2001/0034986 A1 | 11/2001 | Thomas et al. |
| 2003/0177727 A1 | 9/2003 | Gatherum |
| 2005/0034385 A1 | 2/2005 | Broad et al. |
| 2005/0066598 A1 | 3/2005 | Williams |
| 2005/0144856 A1 | 7/2005 | Conlin |

OTHER PUBLICATIONS

WILLFLASH®, Corner Accessory Pieces for Pan Flashing, http://www.willflash.net/problem.htm, Sep. 26, 2005.
Product Literature for Tyvek Flexwrap.
Facts Regarding Elimination of Metal Plate in JAMSILL Products.
Definition of Thermoforming http://en.wikipedia.org/wiki/Thermoforming.
Definition of ABS http://en.wikipedia.org/wiki/Arcylonitrile_butadiene_styrene.

WINDOW SILL FLASHING

RELATED APPLICATIONS

This application claims the benefit of U.S. Provisional Application No. 60/487,343, filed Jul. 15, 2003, the entire contents of which are herein incorporated by reference.

TECHNICAL FIELD

The present invention generally relates to building materials and more particularly relates to window sill flashing for a window frame to prevent the ingress of water.

BACKGROUND OF THE INVENTION

Typical wall construction techniques include forming a rough opening from framing members such that a window opening is formed. The bottom portion of the window opening (called the sill) is susceptible to rotting if water is not prevented from penetrating from around the window perimeter. Additionally, adjacent ceilings, plastered walls, and the like are susceptible to damage if rain-water infiltrates under the window sill.

Many systems are used to solve the problem of water intrusion. One method includes providing a means to collect and control the water that does infiltrate the window perimeter. Alternatively, surface sealing agents, such as caulk, expanding foam, and the like are used as filling agents to fill openings between the periphery of the window and the adjacent, wall surfaces. However, over time, the filling agents have a tendency to dry, crack and shrink, thereby exposing gaps which provide a passageway for water to infiltrate the window perimeter.

SUMMARY OF THE INVENTION

The present invention is directed towards a window sill flashing comprising a base having a substantially rectangular shape. A front flange projects perpendicularly downward from a front edge of the base and at least one side flange extends vertically from a side edge of the base. The side flange includes a front surface. The window sill flashing is made from a vacuum formed, rigid homopolymer vinyl film.

DETAILED DESCRIPTION

Figure 1:
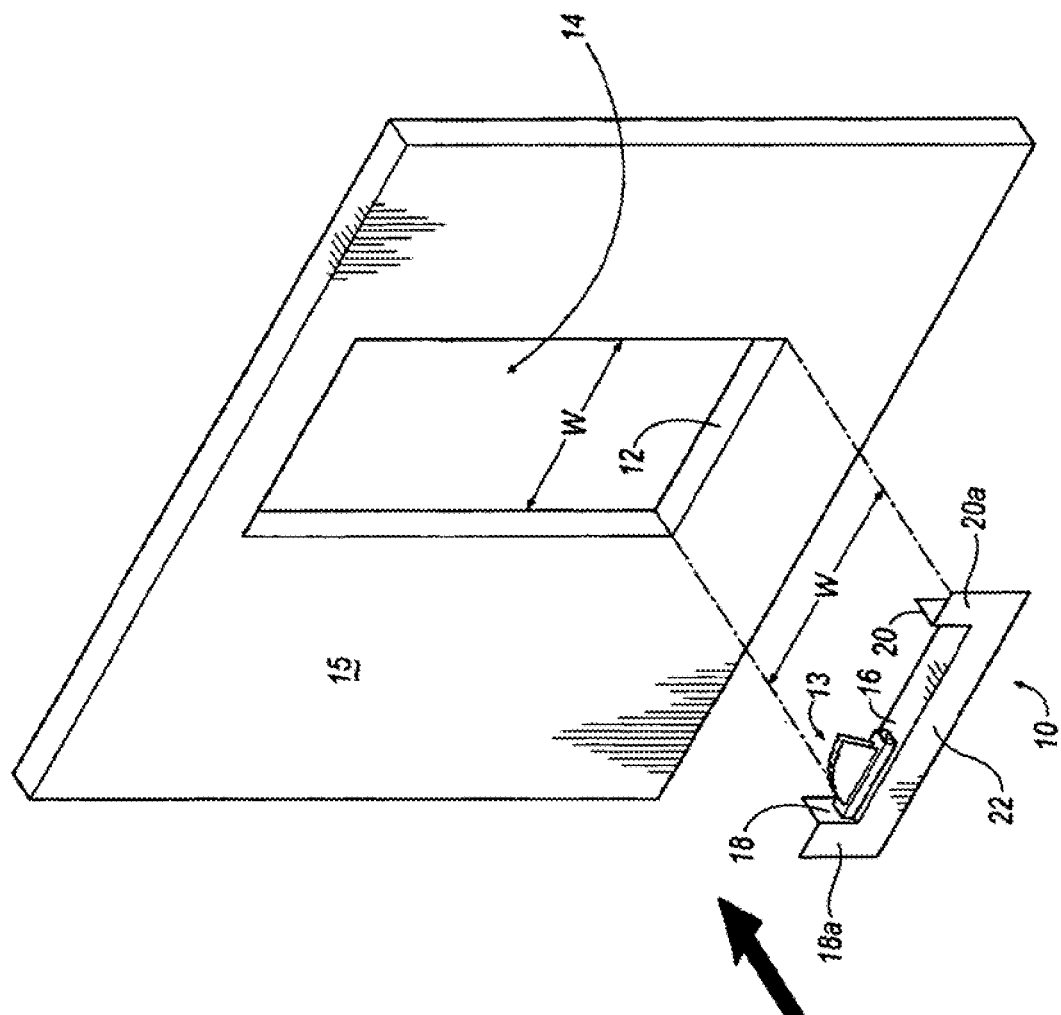
FIG. 1 is an isometric view of a wall having a window opening and a flashing according to an embodiment of the present invention.

Referring to FIG. 1, a window sill flashing (hereinafter referred to as "flashing") 10 is generally shown according to an embodiment of the present invention. The flashing 10 is formed to fit within and snugly conform to a bottom portion 12 of a window opening 14 of a wall 15. Window opening 14 has a width W and is adapted to accept a window assembly 13. As illustrated, the face portion (or flange) 22 of flashing 10 is generally U-shaped and constructed as one piece. The flashing 10 comprises a base 16, a first side flange 18 integrally formed with base 16 at one end, a second side flange 20 integrally formed with base 16 at an opposite end, and a front flange 22 integrally formed with base 16. Preferably base 16, side flanges 18, 20 and front flange 22 are all vacuum formed from a common sheet. Front (U-shaped) flange 22 extends perpendicularly downward from an edge of base 16. First side flange 18 includes a front surface 18*a* and second side flange 20 includes a front surface 20*a*. The flashing 10 is glued, calked, taped, or otherwise permanently secured within window opening 14. It is contemplated that flashing 10 of FIG. 1 is formed in various standard size lengths and widths to accommodate various standard window openings 14 and wall thicknesses.

Figure 3:
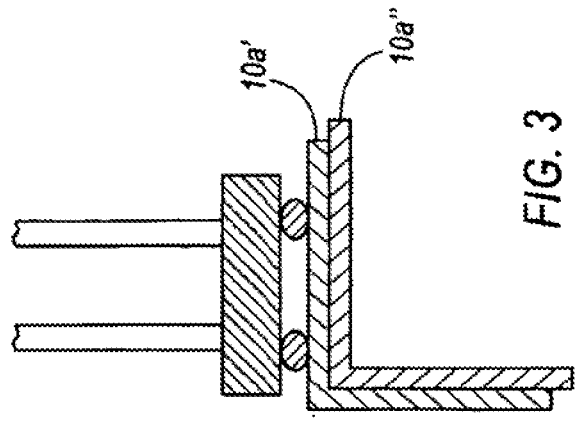
FIG. 3 is a cross-sectional view taken along line 3-3 of FIG. 2.
Figure 2:
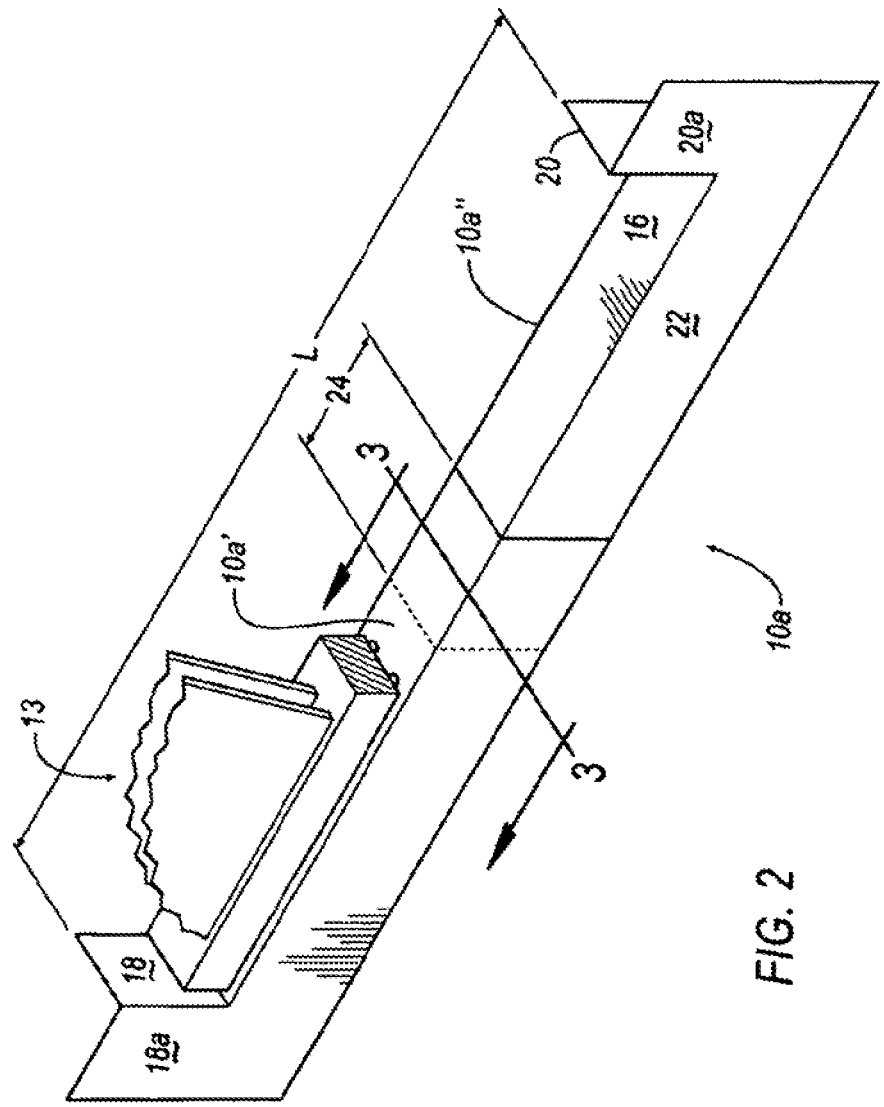
FIG. 2 is an isometric view of a flashing and window assembly according to an embodiment of the present invention.

FIGS. 2 and 3 illustrate a first alternative embodiment of the flashing of FIG. 1, wherein like features are indicated by the same reference number. Flashing 10*a* is fabricated as two separate portions 10*a*' and 10*a*". Portions 10*a*' and 10*a*" form the left and right side of flashing 10. Alternatively, flashing 10*a* is fabricated as a one piece member with a length (prior to cutting) that spans beyond the width W of window opening 14. Prior to installation of flashing 10*a* into window opening 14, flashing 10*a* is cut, resulting in portions of flashings 10*a*' and 10*a*". It can be appreciated that flashing 10*a* may be cut at any point along its length, so long as flashings 10*a*' and 10*a*" fit within window opening 14. Thereafter, portions 10*a*' and 10*a*" are placed so that they partially overlap one another in a region 24 producing flashing 10*a* having length L that is generally equal to the width W of window opening 14. FIG. 3 is a cross-sectional view of the overlap region 24 of portions 10*a*' and 10*a*". One advantage of flashing 10*a* is that flashing 10*a* may be cut to size in the field to accommodate any width W of window opening 14.

Figure 5:
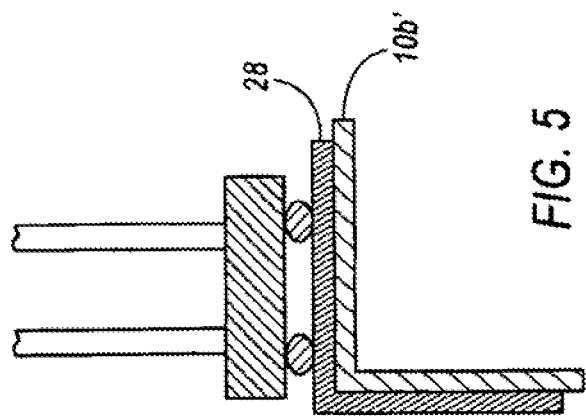
FIG. 5 is a cross-sectional view taken along line 5-5 of FIG. 4.
Figure 4:
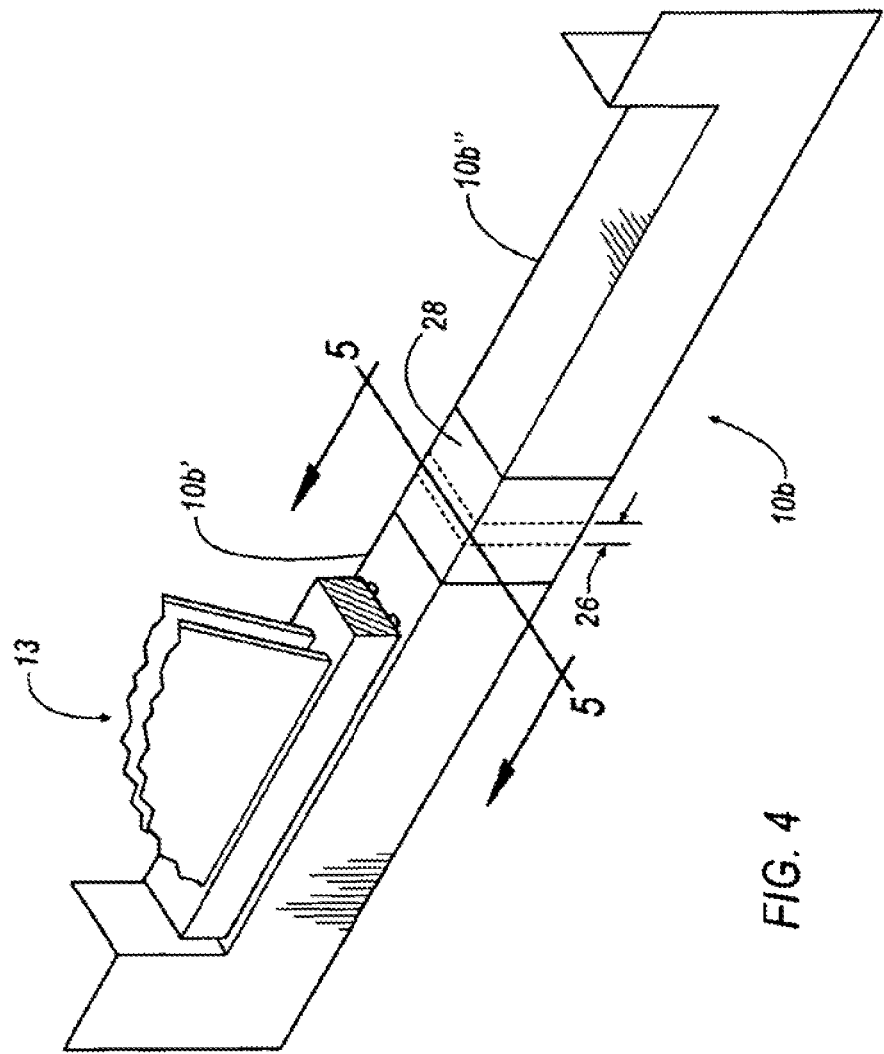
FIG. 4 is an isometric view of the flashing and window assembly according to an alternate embodiment of the present invention.

FIGS. 4 and 5 illustrate a further alternate embodiment of the flashing of the present invention. Flashing 10*b* is similar to flashing 10 and flashing 10*a*, except portions of flashing 10*b*' and 10*b*" do not overlap at region 24. Instead, portions 10*b*' and 10*b*" are separated by a gap 26. As illustrated, gap 26 is narrow relative to the width W of window opening 14. However, it can be appreciated that gap 26 may be any desired length. For instance, gap 26 may expose a substantial portion of width W of window opening 14. Further, gap 26 may be optionally covered with a sill flashing cap 28.

Figure 7:
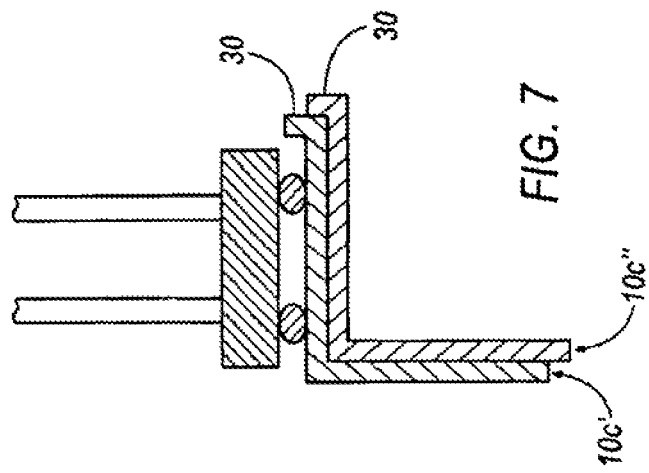
FIG. 7 is a cross-sectional view taken along line 7-7 of FIG. 6.
Figure 6:
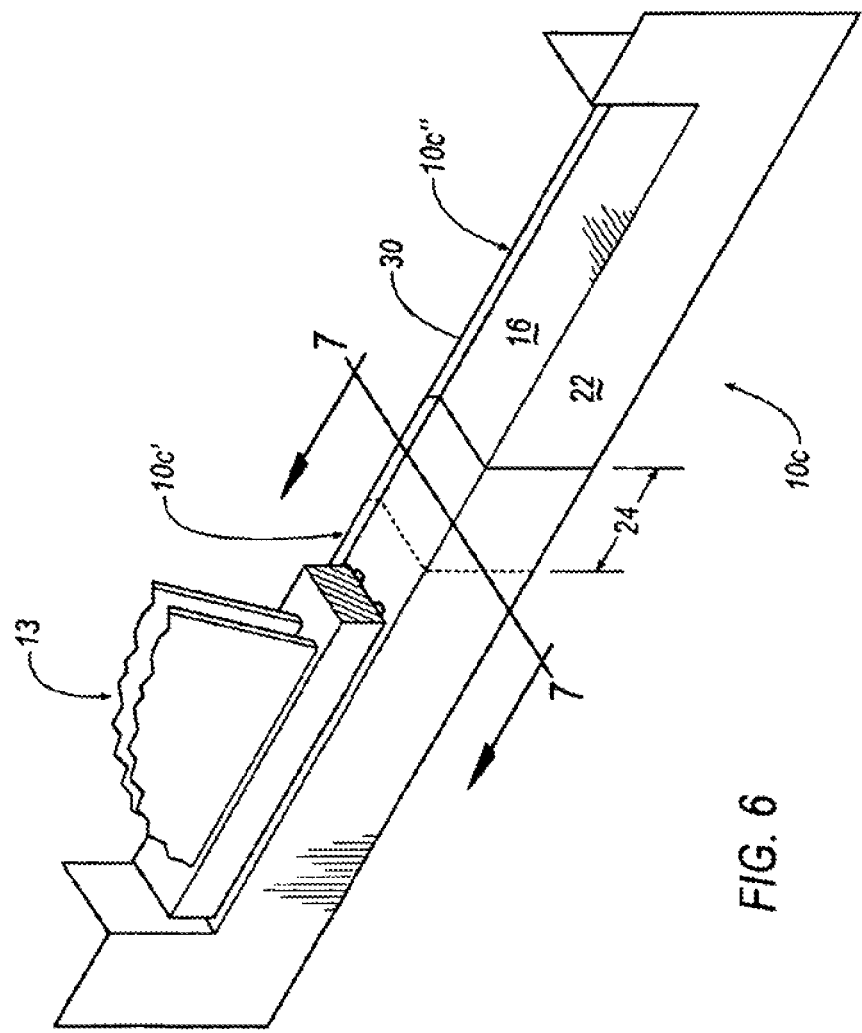
FIG. 6 is a isometric view of the flashing according to yet another alternate embodiment of the present invention.

FIGS. 6 and 7 illustrate a further embodiment of the flashing of the present invention. Flashing 10c is substantially similar to flashing 10a; however, flashing 10c includes a rear, vertical rising wall 30 to further impede the ingress of water. Rear, vertical rising wall 30 is located along an edge of base 16, opposite of front flange 22 and extends perpendicularly upward from base 16.

Figure 9:
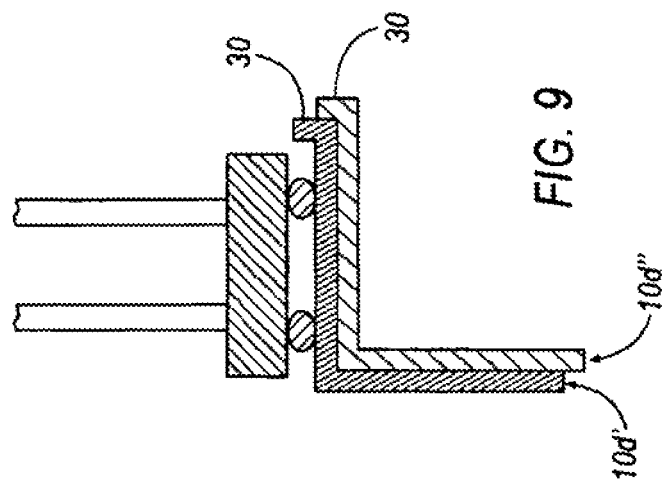
FIG. 9 is a cross-sectional view taken along line 9-9 of FIG. 8.
Figure 8:
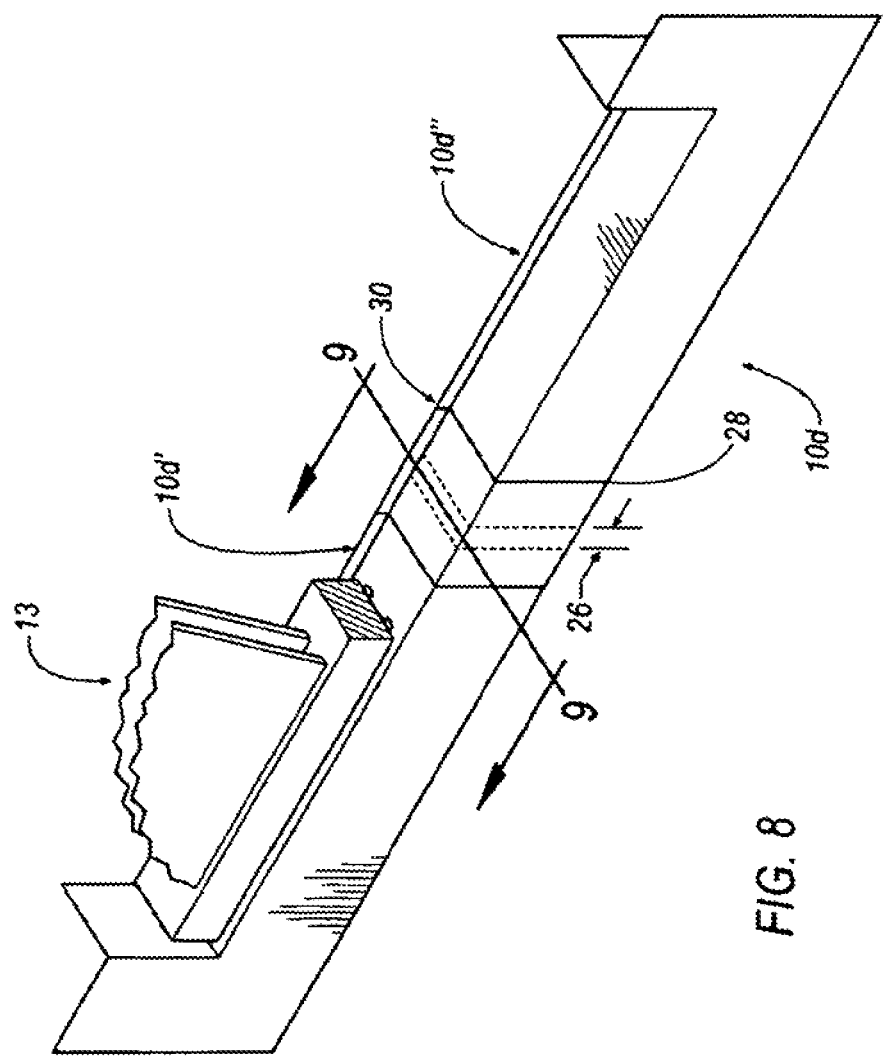
FIG. 8 is an isometric view of the flashing according to still yet another alternate embodiment of the present invention.
Figure 10:
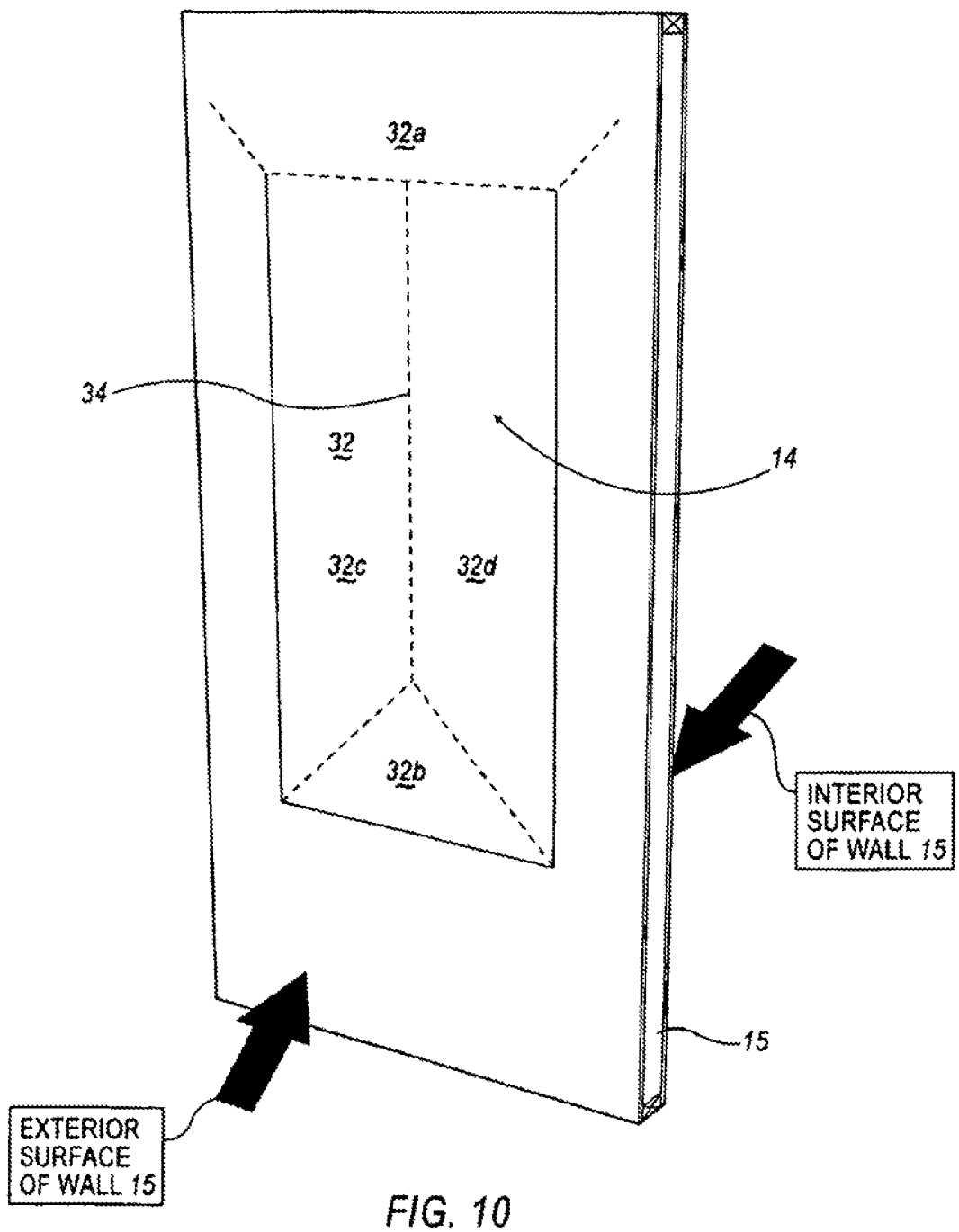
FIG. 10 is a perspective view of a wall having a window opening covered with housewrap.
Figure 11:
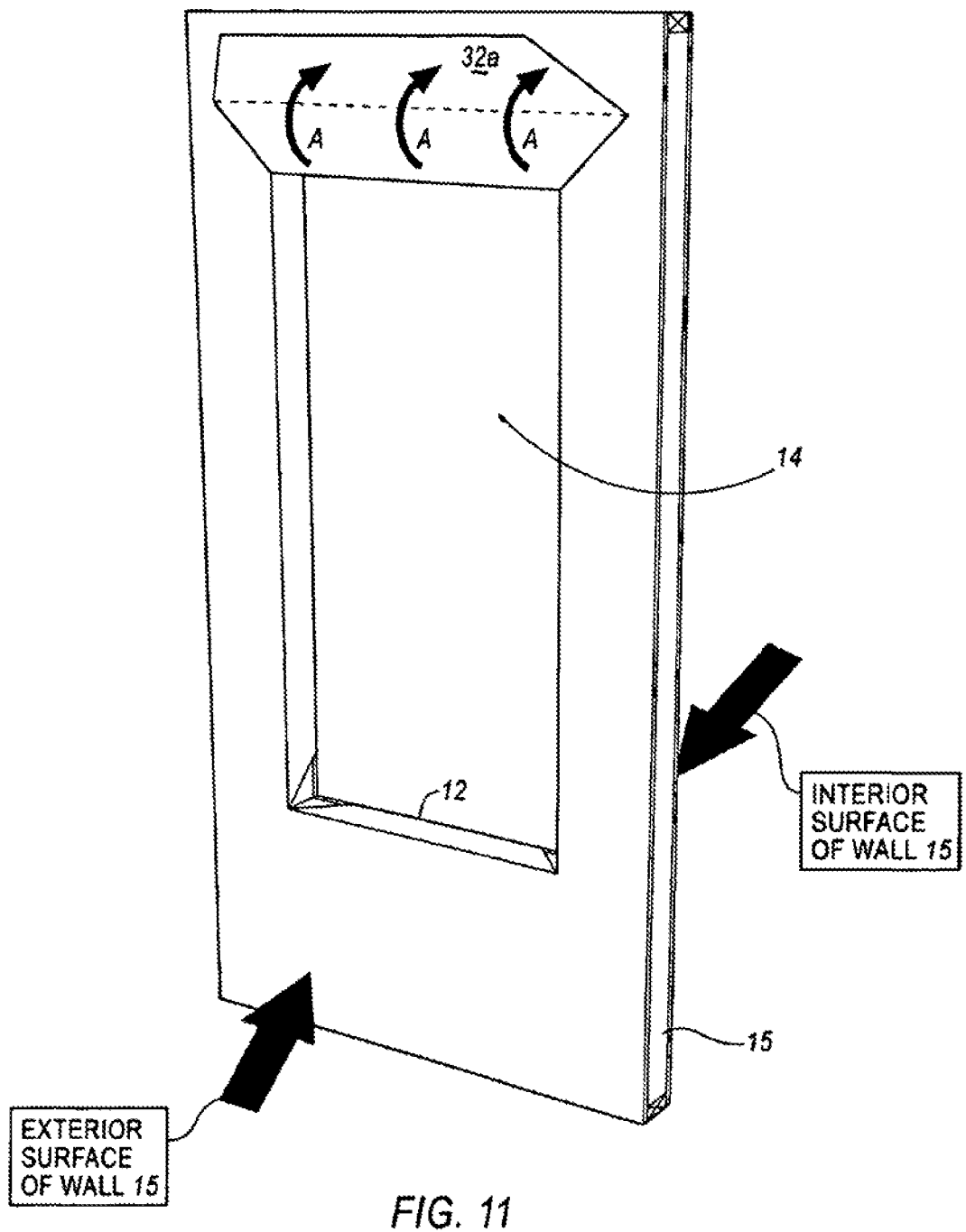
FIG. 11 is a perspective view of a wall having a window opening with the housewrap folded to the proper positions for window installation.
Figure 12:
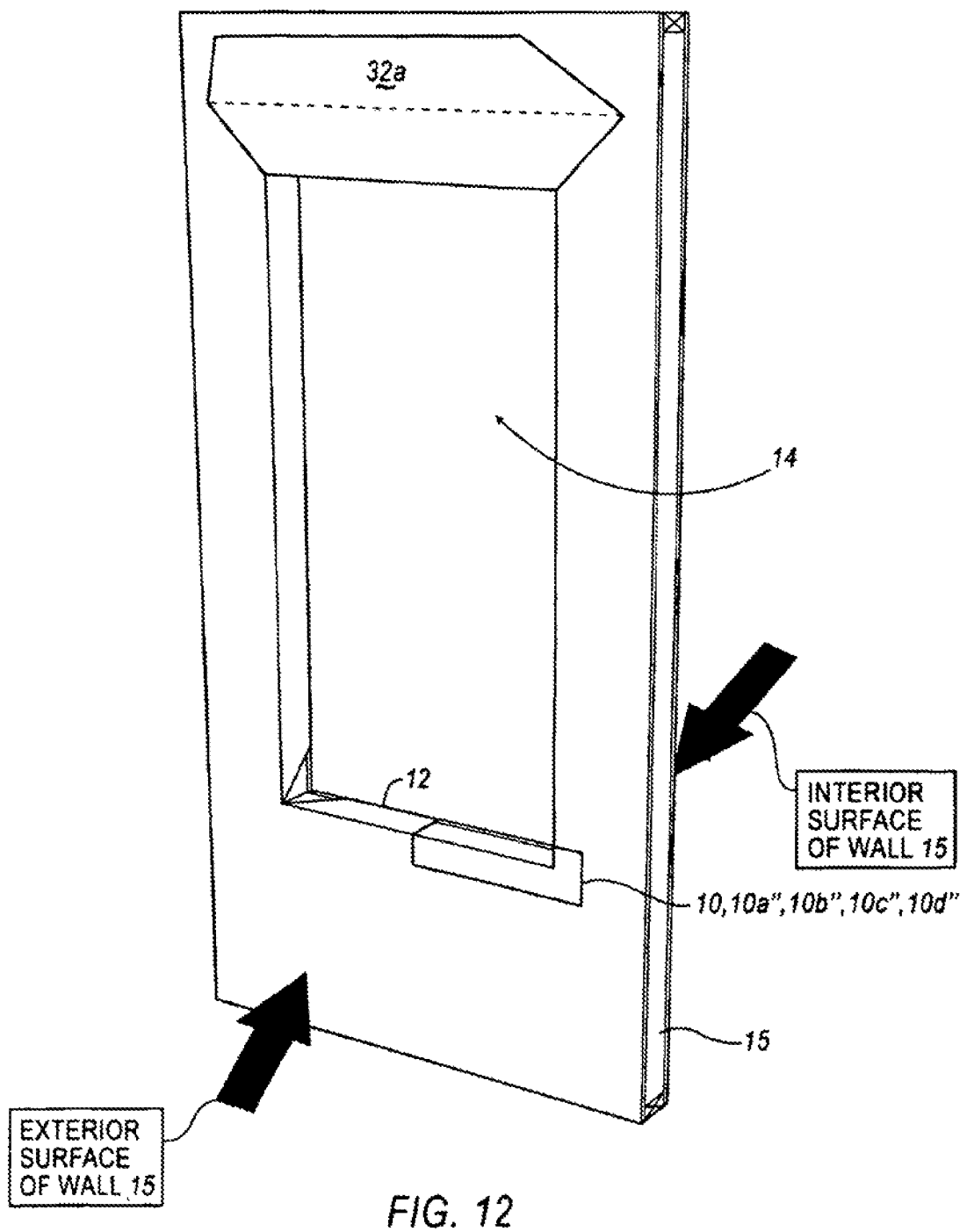
FIG. 12 is a perspective view of a wall having a window opening with a first portion of the flashing of the present invention installed.

FIGS. 8 and 9 illustrate yet another embodiment of the flashing of the present invention. Flashing 10d is substantially similar to flashing 10b; however, flashing 10b includes rear, vertical rising wall 30.

Figure 13:
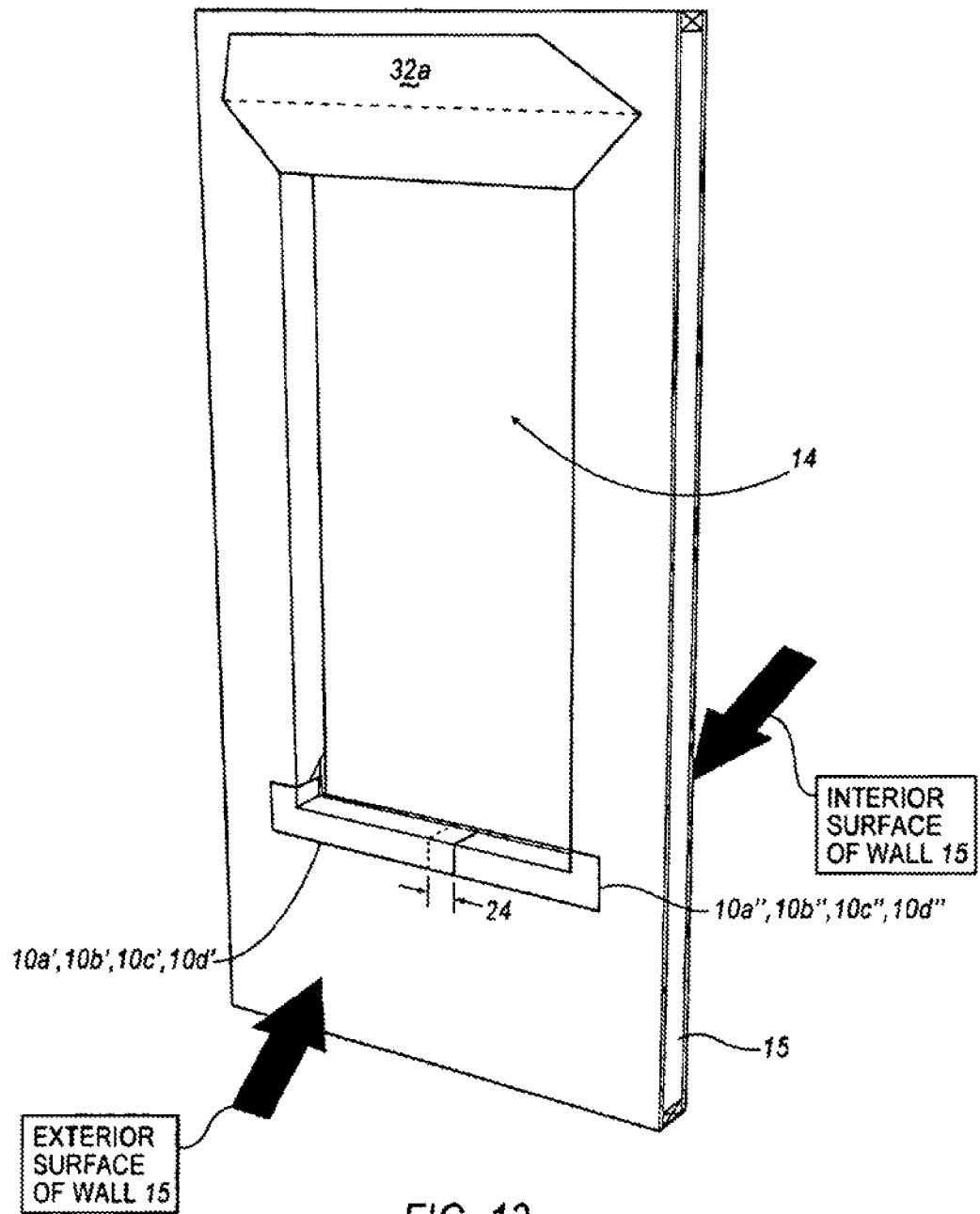
FIG. 13 is a perspective view of a wall having a window opening with a second portion of the flashing installed.
Figure 14:
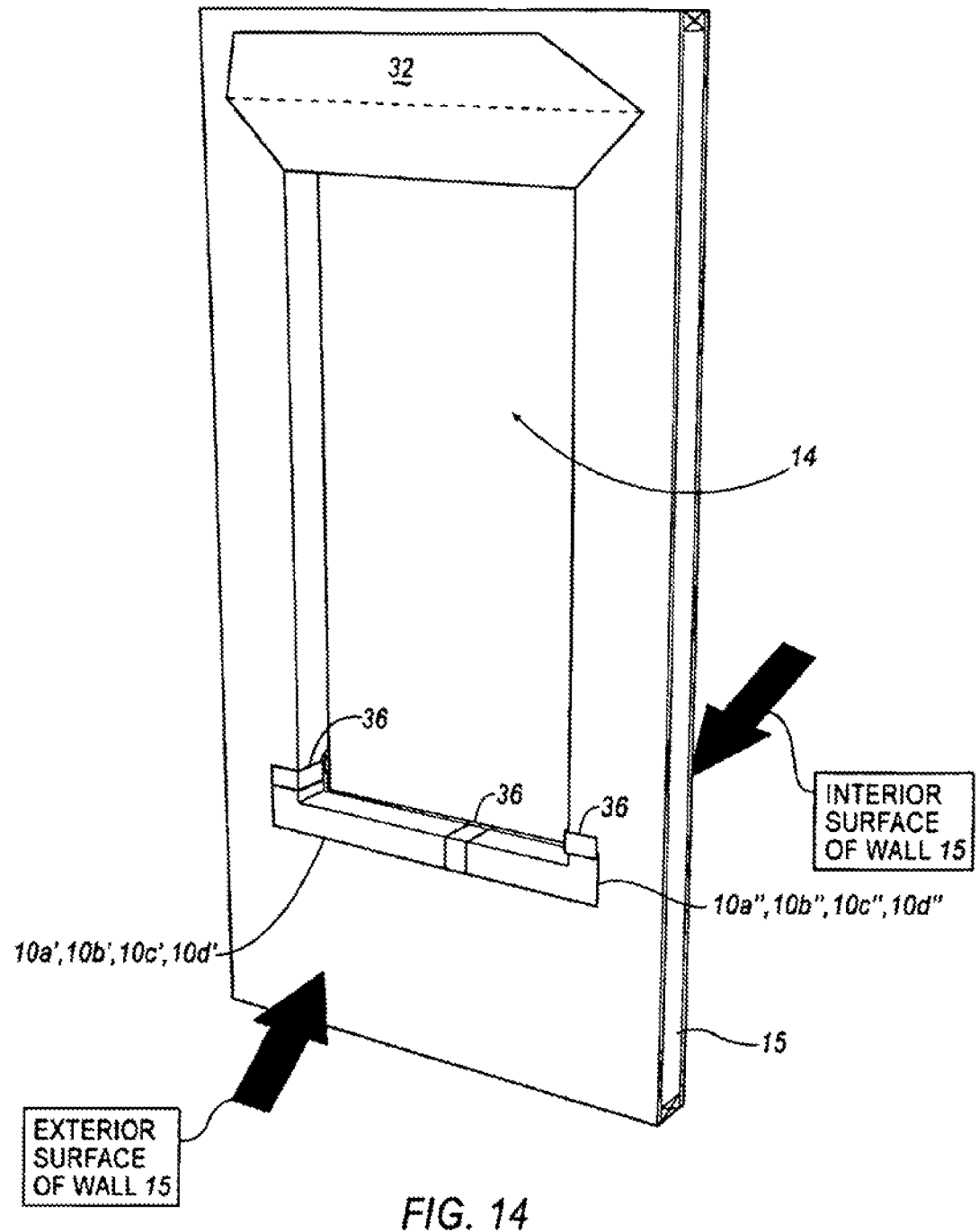
FIG. 14 is a perspective view of a wall having a window opening with two flashing portions taped according to an embodiment of the present invention.

FIGS. 10-14 illustrate the steps for installing flashing 10 within window opening 14. Initially, the window opening 14 is covered with housewrap 32. Housewrap 32 is then cut along perforated lines 34. Perforated lines 34 divide housewrap 32 into upper section 32a, lower section 32b, left side 32c and right side 32d. The lower section 32b and left and right sides 32c, 32d of housewrap 32 are folded inwardly, towards the interior surface of wall 15. Upper section 32a is rolled up towards the exterior of wall 15, in the direction of arrows A (see FIG. 11). Thereafter, flashing 10 or portions of flashing 10a", 10b", 10c' or 10d" are placed on top of bottom portion 12 of window opening 14 (see FIG. 12). FIG. 13 illustrate flashing portions 10a', 10b', 10c', or 10d' being placed along bottom portion 12. Finally, flashing 10 is secured to bottom portion 12. FIG. 14 illustrates flashing 10 being secured to bottom portion 12 with adhesive tape 36. Adhesive tape 36 is also used to seal the seam created by the overlap 24 between right and left portions of the flashing 10. Where there is no overlap 24, adhesive tape 36 may be used to cover the bottom portion 12 of window opening 14. Thereafter, a window 13 is installed within window opening 14.

The flashing 10 of the present invention is preferably manufactured from sheets of thermoforming film, such as a rigid homopolymer vinyl film, or polyvinyl chloride (PVC), or the like. The preferable material properties for flashing 10 are listed in the table below:

| Property | Units | Value |
| --- | --- | --- |
| Gauge Range | Mils | 7.5-35 |
| Gauge Tolerance | % | ±5 |
| Specific Gravity | — | 1.33 |
| Material Yield (Nominal) | in.$^2$/lb. | 2770 (7.5 mil) |
| | | 2080 (10.0 mil) |
| | | 1390 (15.0 mil) |
| | | 1040 (20.0 mil) |
| Tensile Strength (Yield) | lb./in.$^2$ | 6600 |
| Elongation (Break) | % | 180 |
| Tensile Impact Strength | ft-lb./in $^2$ | 275 |
| Cold Break Temperature | ° C. | -30 |
| Heat Deflection Temperature at 264 psi | ° F. | 162 |
| Gloss | % | 115 |

It can be appreciated that the flashing 10 may be covered with a silicone coating for ease of manufacturing and separation of the flashing 10 and for ease in installation of window assembly 13. Flashing 10 is preferably fabricated using vacuum forming techniques. Vacuum forming flashing 10 from thin gage material allows the first and second side flanges 18, 20 to be substantially perpendicular to base 16. The material properties, including the material thickness, provides flexibility to flashing 10, thus allowing the vacuum forming dies to separate from the flashing 10 once the vacuum forming process is completed. Additionally, vacuum forming flashing 10 allows the material to have a minimum thickness (as thin as 7.5 mils). Therefore, when portions of flashing 10 overlap, the resultant gap under the flashing 10 is minimal and does not allow water intrusions.

Due to the geometry and thinness of flashing 10, flashing 10 cannot be manufactured using an injection molding process. If flashing 10 were to be manufactured by injection molding, the minimum thickness feasible for flashing 10 is 40 mm, significantly higher than the practical thickness of flashing 10 formed by the vacuum forming process. Moreover, to maintain the perpendicularity of surfaces 16, 18, 20 and 22 over the depth of base 16, flashing 10 would require ribs, or support struts, to be molded into base 16. These ribs would detract from the functionality of flashing 10. Furthermore, it would be necessary to include ports along base 16 to ensure that sufficient material flows across and covers the entire base 16. These ports would give rise to dimples, or other imperfections in the surface of base 16. The imperfections could create gaps or openings along the window sill, thereby comprising the water impermeability of flashing 10. Even with the use of ports along base 16, obtaining complete flow coverage of injected material is problematic because the preferred depth of base 16 is in the range of 1 inches to 3¼ inches.

The embodiments disclosed herein have been discussed for the purpose of familiarizing the reader with novel aspects of the invention. Although preferred embodiments of the invention have been shown and described, many changes, modifications and substitutions may be made by one having ordinary skill in the art without necessarily departing from the spirit and scope of the invention as described in the following claims.

The invention claimed is:

1. A window sill flashing, comprising a first one-piece sill flashing and a second one-piece sill flashing that are each a continuous shaped structure and each include:
   (i) a base having a substantially rectangular shape and having a front edge and at least one side edge;
   (ii) a front flange projecting perpendicularly downward from the front edge of the base;
   (iii) at least one side flange having a side surface and a front surface, wherein the side surface extends vertically from the at least one side edge of the base and the front surface is coplanar and continuous with the front flange and extends perpendicularly from the side surface; and
   wherein the first one-piece sill flashing and the second one-piece sill flashing are free of seams;
   wherein the first one-piece sill flashing and the second one-piece sill flashing are comprised of a polyvinyl chloride;
   wherein the first one-piece sill flashing and the second one-piece sill flashing each have a thickness in a range of about 7.5 mils to about 35 mils;
   wherein the first one-piece sill flashing and the second one-piece sill flashing are each free of any metallic flanges and free of any metallic coverings applied to a lower surface of the base and an upper surface of the base opposite the lower surface;
   wherein the first one-piece sill flashing and the second one-piece sill flashing are configured to partially overlap to produce the window sill flashing having a length generally equal to a width of a window opening; and
   wherein the lower surface of the base of the first one-piece sill flashing and the lower surface of the base of the second one-piece sill flashing are configured to be in direct contact with a housewrap at a bottom portion of the window opening.

2. The window sill flashing of claim 1, wherein the first one-piece sill flashing and the second one-piece sill flashing are each a vacuum-formed unitary structure.

3. The window sill flashing of claim 1, wherein the first one-piece sill flashing and the second one-piece sill flashing are each free of a rear wall projecting from a rear edge of the base, opposite the front edge.

4. The window sill flashing of claim 1, wherein the first one-piece sill flashing and the second one-piece sill flashing each include a rear wall which extends perpendicularly upward along a rear edge of the base, opposite the front edge, and the rear wall is part of the continuous shaped structure.

5. The window sill flashing of claim 2, wherein the first one-piece sill flashing and the second one-piece sill flashing consist of a thermoformed film having the polyvinyl chloride.

6. The window sill flashing of claim 1, wherein the first one-piece sill flashing and the second one-piece sill flashing consist of the polyvinyl chloride.

7. The window sill flashing of claim 1, wherein a silicone coating covers both the first one-piece sill flashing and the second one-piece sill flashing.

8. The window sill flashing of claim 1, wherein the first one-piece sill flashing overlaps the second one-piece sill flashing so that the base of the first one-piece sill flashing overlaps the base of the second one-piece sill flashing and the front flange of the first one-piece sill flashing overlaps the front flange of the second one-piece sill flashing.

9. The window sill flashing of claim 8, wherein an adhesive tape is located on an overlap between the first one-piece sill flashing and the second one-piece sill flashing to seal a seam between the first one-piece sill flashing and the second one-piece sill flashing.

10. The window sill flashing of claim 1, wherein the base of both the first one-piece sill flashing and the second one-piece sill flashing is free of dimples.

11. A method of making and installing a window sill flashing, comprising:
 a) forming a first one-piece sill flashing that is a continuous shaped structure without seams which includes:
  (i) a base having a substantially rectangular shape and a front edge and at least one side edge;
  (ii) a front flange projecting perpendicularly downward from the front edge of the base;
  (iii) at least one side flange having a side surface and a front surface, wherein the side surface extends vertically from the at least one side edge of the base and the front surface is coplanar and continuous with the front flange and extends perpendicularly from the side surface;
 b) forming a second one-piece sill flashing that is a continuous shaped structure without seams which includes:
  (i) a base having a substantially rectangular shape and a front edge and at least one side edge;
  (ii) a front flange projecting perpendicularly downward from the front edge of the base;
  (iii) at least one side flange having a side surface and a front surface, wherein the side surface extends vertically from the at least one side edge of the base and the front surface is coplanar and continuous with the front flange and extends perpendicularly from the side surface; and
 c) applying a housewrap to a window opening such that the housewrap covers a bottom portion of the window opening and a portion of an exterior wall in which the window opening is located;
 d) installing the first one-piece sill flashing and the second one-piece sill flashing such that they are located on the bottom portion of the window opening having the housewrap thereon;
 wherein the first one-piece sill flashing and the second one-piece sill flashing partially overlap and are in direct contact with one another to produce the window sill flashing having a length generally equal to a width of the window opening;
 wherein the base of both the first one-piece sill flashing and the second one-piece sill flashing is in direct contact with the bottom portion of the window opening having the housewrap thereon;
 wherein both the first one-piece sill flashing and the second one-piece sill flashing are free of any metallic flanges and free of any metallic coverings applied to a lower surface of the base or an upper surface of the base opposite the lower surface;
 wherein the forming of the first one-piece still flashing and the second one-piece sill flashing is a vacuum-forming of a thermoforming film; and
 wherein the first one-piece sill flashing and the second one-piece sill flashing each have a thickness in the range of about 7.5 mils to 35 mils.

12. The method of claim 11, wherein the first one-piece sill flashing is formed from a first common sheet.

13. The method of claim 12, wherein the second one-piece sill flashing is formed from a second common sheet.

14. The method of claim 11, wherein the thermoforming film comprises a polyvinyl chloride.

15. The method of claim 11, wherein the method includes applying a silicone coating to cover both the first one-piece sill flashing and the second one-piece sill flashing.

16. The method of claim 11, wherein after the forming, the first one-piece sill flashing and the second one-piece sill flashing are each free of a rear wall projecting from a rear edge of the base, opposite the front edge.

17. The method of claim 11, wherein the first one-piece sill flashing and the second one-piece sill flashing are each formed to also include a rear wall which extends perpendicularly upward along a rear edge of the base, opposite the front edge, and the rear wall is part of the continuous shaped structure.

* * * * *